(No Model.)
P. HANSEN.
STUMP PULLER.
No. 313,325. Patented Mar. 3, 1885.
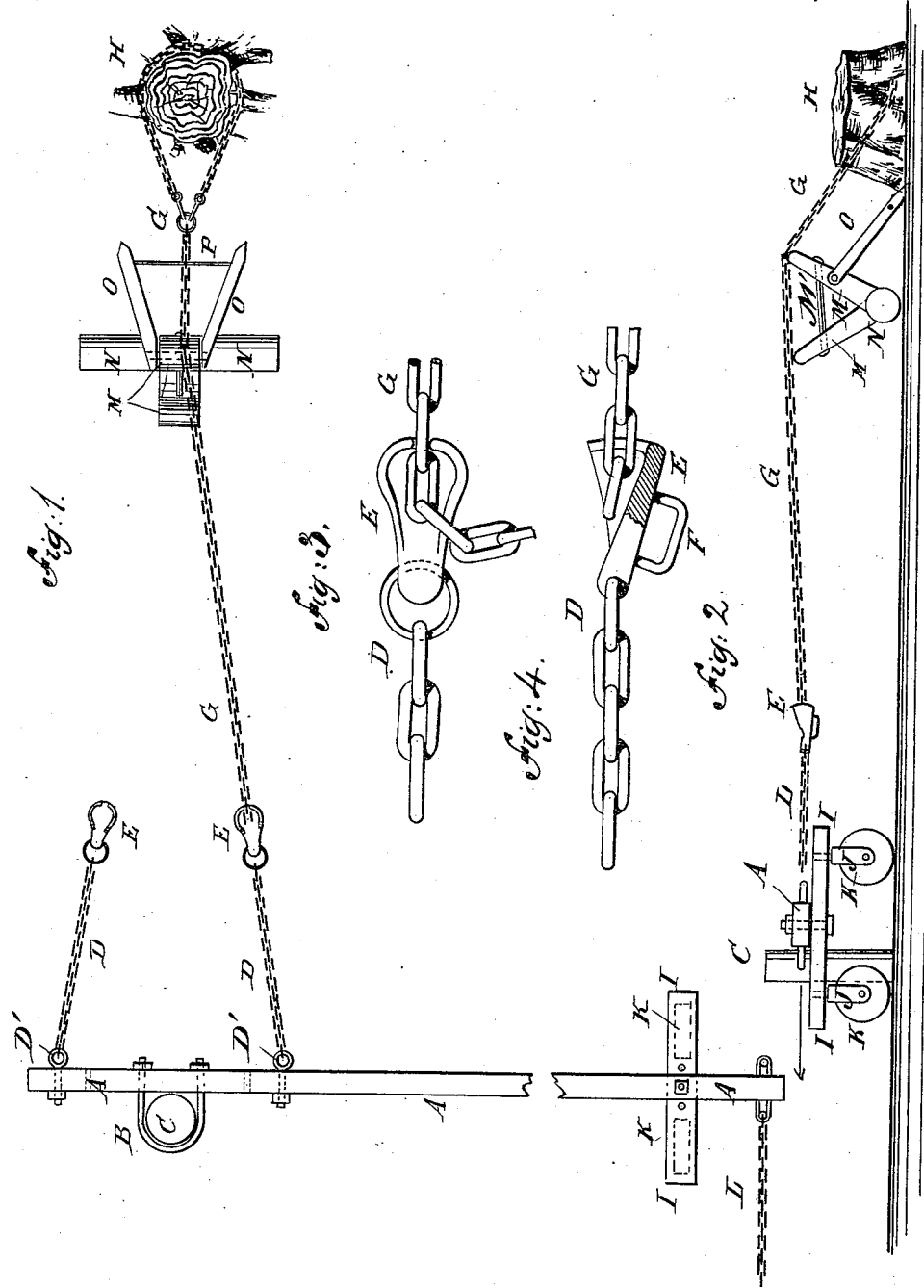
WITNESSES:
INVENTOR:
P. Hansen
BY Munn & Co.
ATTORNEYS.

UNITED STATES PATENT OFFICE.

PETER HANSEN, OF WAUPACA, WISCONSIN.

STUMP-PULLER.

SPECIFICATION forming part of Letters Patent No. 313,325, dated March 3, 1885.

Application filed October 18, 1884. (No model.)

*To all whom it may concern:*

Be it known that I, PETER HANSEN, of Waupaca, in the county of Waupaca and State of Wisconsin, have invented a new and useful Improvement in Stump-Pullers, of which the following is a full, clear, and exact description.

Reference is to be had to the accompanying drawings, forming a part of this specification, in which similar letters of reference indicate corresponding parts in all the figures.

Figure 1 is a plan view of my improved stump-puller shown in position for use. Fig. 2 is a side elevation of the same. Fig. 3 is a plan view of the clutch enlarged and shown as connecting the chains. Fig. 4 is a side elevation of the same shown partly in section.

The object of this invention is to facilitate the pulling of stumps and small trees, and promote simplicity in the construction, convenience in the use, and efficiency in the operation of stump-pullers.

The invention consists in the peculiar construction and arrangement of parts, as hereinafter fully described, and pointed out in the claims.

A is a long lever, which is connected at a little distance from one end by a bow or chain, B, to a stump, tree, post, or other suitable fixed support, C, to serve as a fulcrum to the said lever.

To the lever A, upon the opposite sides of and equally distant from the fulcrum C, are attached the ends of two short chains, D, to the outer ends of which are attached clutches E. The chains D are secured adjustably to the lever A by eyebolts D', or other suitable means, so that they can be readily adjusted nearer to or farther from the fulcrum C, according as an increase of power or of speed may be required.

The clutches E are made with a recess upon one side, and with slotted forward ends to adapt them to be applied to the links of a chain, the adjacent links resting in the recesses in the said clutches. The clutches E are provided with handles F, for convenience in applying them to the links of a chain. The clutches E are applied successively to the links of the chain G, the end of which is secured to the stump H to be pulled.

To the lever A, near its free end, is swiveled the middle part of a bar, I, to the end parts of which are swiveled the standards J of two small wheels, K, so that the said wheels will act as caster-wheels to support the lever A above the ground and cause it to move easily.

The free end of the lever A can be supported upon a shoe, if desired, and the said lever is so formed that it can be reversed or used with either side upward.

The power is applied to the free end of the lever A, as indicated, by the chain L.

M represents two short bars, or a bent bar, attached at their inner ends or angle to a cross-bar, N, forming a bent lever, the arms of which are connected at a little distance from their outer ends by a brace-bar, M'. The cross-bar N serves as a fulcrum to the bent lever M, and is made of a sufficient length and size to prevent it from being forced into the ground by pressure.

To the opposite sides of the middle part of one arm of the short lever M are hinged the upper ends of two short braces, O, the lower parts of which are connected and held in proper relative position by a rod, P, as shown in Figs. 1 and 2.

In using the machine the lever A is connected with a fulcrum, C, the end of the chain G is attached to the stump H to be pulled, and one of the clutches E is applied to the said chain G. Power is then applied to the free end of the lever A in the direction to draw upon the chains D G. When the free end of the lever A has been moved a suitable distance, the other clutch D is applied to the chain G, and the free end of the lever A is drawn in the other direction, and so on until the stump has been drawn from the ground.

The lever M is placed beneath the chain G at a little distance from the stump H, and with the arm provided with the braces O inclined toward the said stump. The forward arm of the lever M is held up from the ground, and its rear arm is held in contact with the said chain by the braces O, so that when the chain G is drawn taut it will cause the arms of the lever M to engage successively with the chain G and raise the part of the said chain G next the stump H into an inclined position, so as to draw the stump H upward, as shown in Fig 2.

Having thus described my invention, I claim as new and desire to secure by Letters Patent—

1. In a stump-puller, the combination, with the lever A, the bow or chain B, the chains D, having clutches E, and the chain G, of the bar I, swiveled to the lever A, and swiveled wheels J K on said bar I, substantially as herein shown and described, whereby the free end of the said lever will be supported while being operated, as set forth.

2. In a stump-puller, the combination, with the lever A, the bow or chain B, the chains D, having clutches E, and the long chain G, of the bent lever M, the cross-bar N, and the hinged braces O, substantially as herein shown and described, whereby the part of the long chain next the stump will be made to take an inclined position when put under tension, as set forth.

3. In a stump-puller, the clutches E, made, substantially as herein shown and described, with a slot in one end to engage with a link of the chain, and a recess in one side to receive the adjacent links, whereby the said clutches can be readily applied and detached and will keep their places securely, as set forth.

PETER HANSEN.

Witnesses:
CHAS. CHURCHILL,
EDWIN SELLECK.